(12) United States Patent
Marcoz

(10) Patent No.: US 7,669,833 B2
(45) Date of Patent: Mar. 2, 2010

(54) CRANK ATTACHMENT FOR A VALVE

(76) Inventor: James R. Marcoz, 562 Broadway Extension, East McKeesport, PA (US) 15035

( * ) Notice: Subject to any disclaimer, the term of this patent is extended or adjusted under 35 U.S.C. 154(b) by 782 days.

(21) Appl. No.: 11/246,869

(22) Filed: Oct. 7, 2005

(65) Prior Publication Data

US 2007/0080313 A1  Apr. 12, 2007

(51) Int. Cl.
*F16K 31/00* (2006.01)
(52) U.S. Cl. .......................... 251/293; 251/292; 16/427
(58) Field of Classification Search ................ 251/291, 251/292, 293; 16/422, 427, 428
See application file for complete search history.

(56) References Cited

U.S. PATENT DOCUMENTS

| | | | | | |
|---|---|---|---|---|---|
| 1,931,751 | A | * | 10/1933 | Brown et. al. ................ | 251/76 |
| 4,036,205 | A | * | 7/1977 | Hayes ........................ | 126/535 |
| 4,161,891 | A | * | 7/1979 | Bossert ...................... | 16/422 |
| 4,266,320 | A | * | 5/1981 | Grant ......................... | 16/427 |
| 4,865,078 | A | * | 9/1989 | Ensign ...................... | 137/636.1 |
| 5,607,127 | A | * | 3/1997 | Ballonez ..................... | 248/72 |
| 6,293,515 | B1 | * | 9/2001 | Clark ......................... | 251/129.03 |
| 6,662,821 | B2 | * | 12/2003 | Jacobsen et al. ............ | 137/312 |
| 6,908,068 | B2 | * | 6/2005 | Fortino et al. ................ | 251/59 |
| 7,082,644 | B2 | * | 8/2006 | Senner ....................... | 16/427 |

OTHER PUBLICATIONS

"engage." Dictionary.com Unabridged (v 1.0.1). Random House, Inc. 14 Dec. 2006. <Dictionary.com http://dictionary.reference.com/browse/engage>.*
"adjacent." WordNet® 2.1. Princeton University. Dec. 14, 2006. <Dictionary.com http://dictionary.reference.com/browse/adjacent>.*
"ovate." WordNet® 2.1. Princeton University. Dec. 14, 2006. <Dictionary.com http://dictionary.reference.com/browse/ovate>.*

* cited by examiner

*Primary Examiner*—John Rivell
*Assistant Examiner*—Andrew J Rost
(74) *Attorney, Agent, or Firm*—James Ray & Assoc.

(57) ABSTRACT

An apparatus for assisting in turning the handle of a spigot. The apparatus comprises a first substantially flat member having a first predetermined shape and made of a predetermined material. The first member has a plurality of apertures disposed therein. There is a second member which has a second predetermined shape and is engageable with the first member adjacent an outer edge thereof, such second member is disposed at substantially a right angle to the first member and a means engageable with the first member and such handle for attaching the first member to such handle of such spigot.

18 Claims, 2 Drawing Sheets

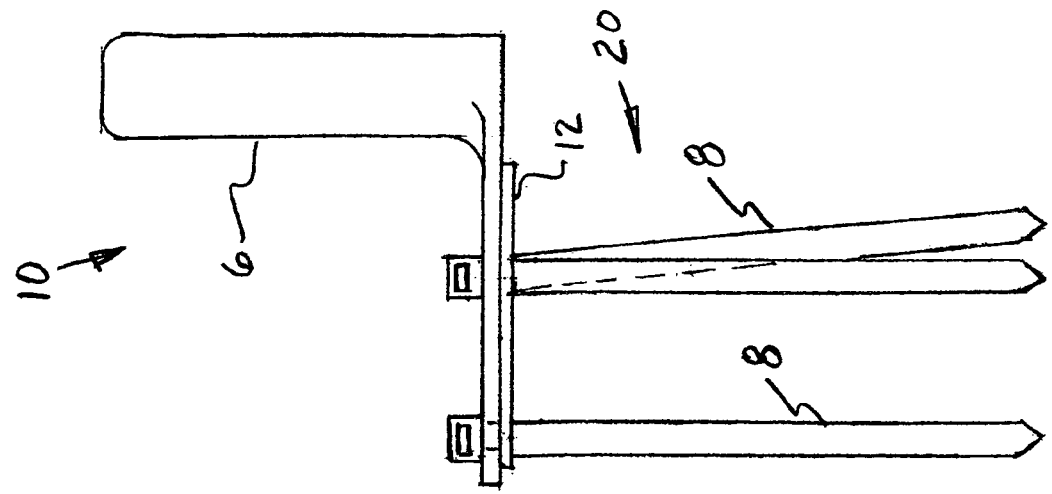
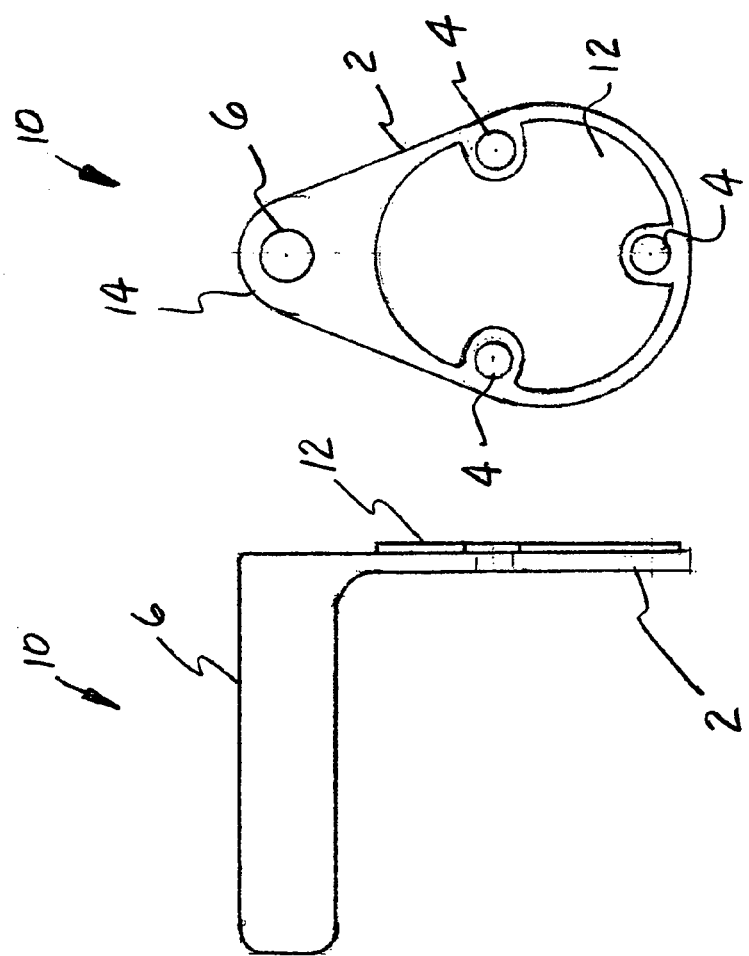

CRANK ATTACHMENT FOR A VALVE

FIELD OF THE INVENTION

The present invention relates, in general, to a crank, and more specifically, the present invention relates to a crank attachment for a water valve, such as an outside spigot, that makes turning the handle on such valve much easier.

BACKGROUND OF THE INVENTION

There are many outdoor spigots with a round handle that turns the valve so as to open the valve to let water flow and turns in a reverse manner to shut the water off. Many of these handles are difficult to turn and equally as many need the handle to be turned many times to get the full flow of water. Further some of these spigots may be in located in places where it is difficult to get a good hold of the handle.

It would be desirable if there were an apparatus that would assist in the turning of the handle so as to simplify the turning on and turning off the water from one of these spigots.

SUMMARY OF THE INVENTION

The present invention provides an apparatus for assisting in turning the handle of a spigot. The apparatus comprises a first substantially flat member having a first predetermined shape and made of a predetermined material. The first member has a plurality of apertures disposed therein. There is a second member which has a second predetermined shape and is engageable with the first member adjacent an outer edge thereof, such second member is disposed at substantially a right angle to the first member; and a means engageable with the first member and such handle for attaching the first member to such handle of such spigot.

OBJECTS OF THE INVENTION

It is, therefore, one of the primary objects of the present invention to provide a crank that attaches to the handle of a spigot to make such handle easier to turn.

Another object of the present invention is to provide a crank that attaches to the handle of a spigot that can be attached with strapping.

Yet another object of the present invention is to provide a crank that attaches to the handle of a spigot that can be made of metal or plastic.

Still another object of the present invention is to provide a crank that attaches to the handle of a spigot that is one piece construction.

These and various other objects and advantages of this invention will become apparent after a full reading of the following detailed description, particularly, when read in conjunction with the appended claims.

BRIEF DESCRIPTION OF THE DRAWINGS

FIG. 1 is a side elevation view of the apparatus according to an embodiment of the invention with tie straps.

FIG. 2 is a bottom view of the apparatus shown in FIG. 1.

FIG. 3 is a side view of the apparatus shown in FIG. 2 turned on its side without tie straps.

Figure 5:
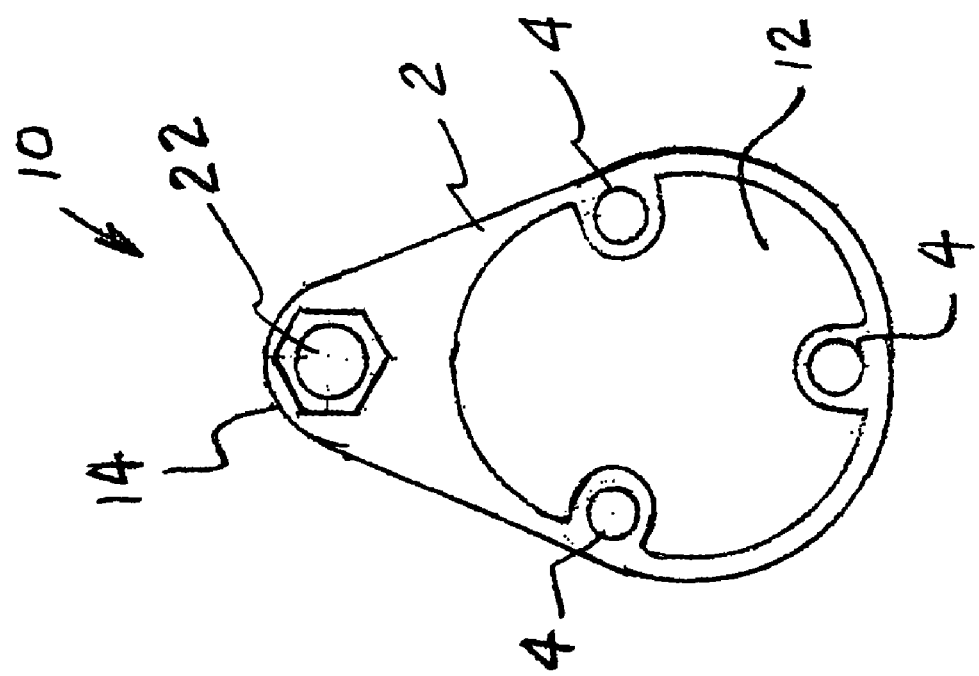
FIG. 5 is a bottom view of the apparatus shown in FIG. 4.

BRIEF DESCRIPTION OF THE PRESENTLY PREFERRED AND ALTERNATE EMBODIMENTS OF THE INVENTION

Prior to proceeding with the more detailed description of the present invention it should be noted that, for the sake of clarity, identical components which have identical functions have been designated by identical reference numerals throughout the several views illustrated in the drawings.

The present invention provides an apparatus, generally designated 10, for assisting in turning the handle of a spigot (not shown). The apparatus comprises a first substantially flat member 2 having a first predetermined shape and made of a predetermined material. The first member 2 has a plurality of apertures 4 disposed therein. There is a second member 6 which has a second predetermined shape and is engageable with the first member 2 adjacent an outer edge thereof. Such second member 6 is disposed at substantially a right angle to the first member 2. Such apparatus 10 further includes a means, generally designated 20, that is engageable with the first member 2 and with such handle (not shown) for attaching the first member 2 to such handle of such spigot.

In a presently preferred embodiment of the invention such first predetermined shape of such first member 2 is substantially ovate, while such second predetermined shape of such second member 6 is substantially cylindrical.

Such means 20 for attaching such first member 2 of the apparatus 10 to such handle includes a plurality of strapping ties 8 that are disposed through such plurality of apertures 4 disposed in such first member 2 and engage the handle of the spigot to secure the apparatus 10 to such handle. It is presently preferred that there are three apertures 4 and three strapping ties 8.

Such means 20 for attaching the first member 2 to such handle further includes an adhesive material 12 disposed on an underside of the first member 2 for engagement with such handle. It is presently preferred that such adhesive material 12 is double faced tape 12.

Further it is preferred that such first member 2 and such second member 6 are formed as a single unit and are a one piece casting. It is also preferred that the outer edge of the first member 2 that is engageable with the second member 6 is a narrower portion 14 of the substantially ovate or teardrop shape of first member 2.

It is also preferred that such predetermined material from which such first member 2 and such second member 6 are made is at least one of plastic and metal. It is presently preferred that such material is metal and that such metal is aluminum. It is also preferred that such second member 6 be substantially hollow so as to make the apparatus 10 lighter.

Figure 4:
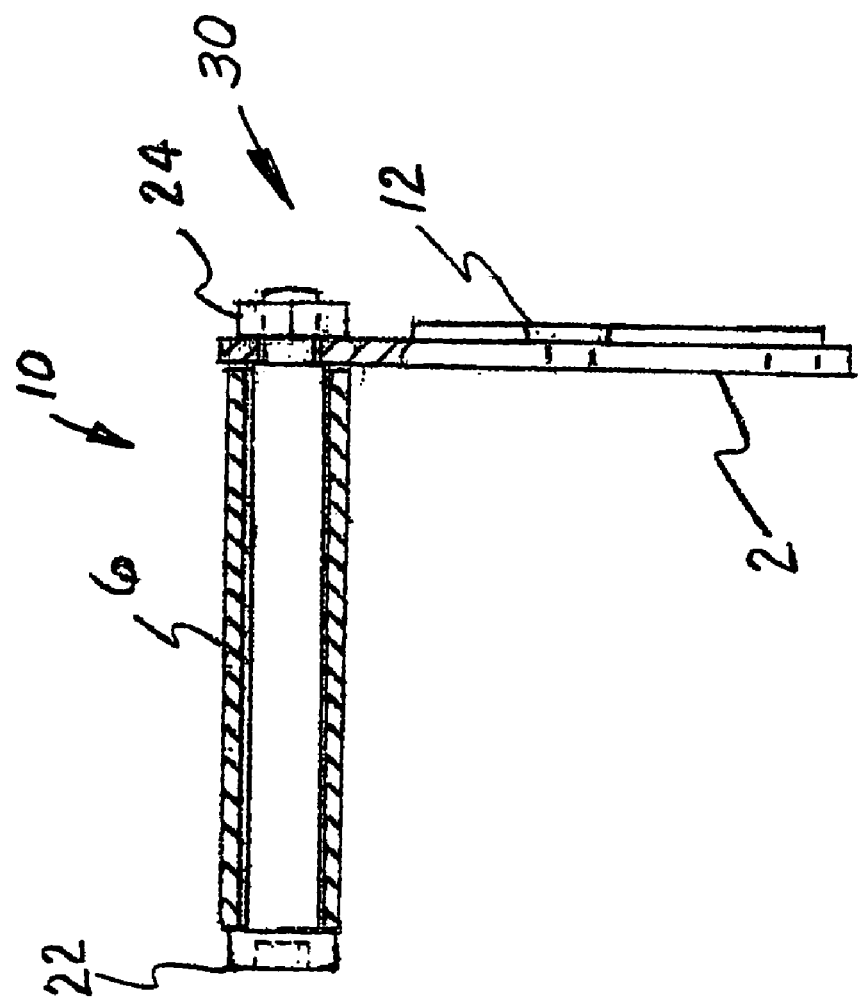
FIG. 4 is cross section view of the apparatus according to an alternate embodiment of the invention.

An alternate embodiment of the invention, illustrated in FIGS. 4 and 5, provides that such first member 2 and such second member 6 are separate entities. In this embodiment there is a first means, generally designated 30, for attaching said second member to said first member and a second means 20 engageable with the first member and such handle for attaching the first member to such handle of such spigot.

It is presently preferred that such second member 6 is engaged with such first member 2 by means of a bolt 22 and a nut 24. In this embodiment such first member 2 and such second member 6 are made separately and assembled when needed. Although a bolt and nut assembly is shown it is within the concept of the invention that such first member 2 and such second member 6 may be engageble by other commonly used means.

While both the presently preferred and a number of alternative embodiments of the present invention have been described in detail above it should be understood that various other adaptations and modifications of the present invention can be envisioned by those persons who are skilled in the relevant art without departing from either the spirit of the invention or the scope of the appended claims.

I claim:

1. An apparatus for assisting in turning the handle of a spigot, said apparatus comprising:
   (a) a first substantially flat member having a substantially ovate shape and made of a first predetermined material, said first member having a plurality of apertures disposed therein;
   (b) a second member made of a second predetermined material having a predetermined shape and engageable with said first member adjacent an outer edge thereof, said second member disposed at substantially a right angle to said first member; and
   (c) a means engageable with said first member and such handle for attaching said first member to such handle of such spigot.

2. The apparatus, according to claim 1, wherein said first member and said second member are formed as a single piece casting.

3. The apparatus, according to claim 1, wherein said outer edge of said first member that is engageable with said second member is a narrower portion of said substantially ovate shape of said first member.

4. The apparatus, according to claim 1, wherein said predetermined shape is substantially cylindrical.

5. The apparatus, according to claim 1, wherein said means for attaching to such handle at least includes a plurality of strapping ties.

6. The apparatus, according to claim 5, wherein said plurality of strapping ties are disposed through said plurality of apertures in said first member.

7. The apparatus, according to claim 5, wherein said plurality of apertures and said plurality of strapping ties is three.

8. The apparatus, according to claim 5, wherein said means for attaching said first member to such handle further includes an adhesive material disposed on an underside of said first member for engagement with such handle.

9. The apparatus, according to claim 8, wherein said adhesive material is double faced tape.

10. The apparatus, according to claim 1, wherein said predetermined material is selected from at least one of plastic and metal.

11. The apparatus, according to claim 10, wherein said first and said second members are made of similar materials.

12. The apparatus, according to claim 10, wherein said predetermined material is metal.

13. The apparatus, according to claim 12, wherein said metal is aluminum.

14. An apparatus for assisting in turning the handle of a spigot, said apparatus comprising:
   (a) a first substantially flat member having a first predetermined shape and made of a predetermined material, said first member having a plurality of apertures disposed therein;
   (b) a second member made of a second predetermined material having a second predetermined shape and engageable with said first member adjacent an outer edge thereof, said second member disposed at substantially a right angle to said first member;
   (c) a first means engageable with said first member and with said second member for attaching said second member to said first member includes a bolt and a nut; and
   (d) a second means engageable with said first member and such handle for attaching said first member to such handle of such spigot.

15. The apparatus, according to claim 14, wherein said second means for attaching to such handle at least includes a plurality of strapping ties.

16. The apparatus, according to claim 15, wherein said second means for attaching said first member to such handle further includes an adhesive material disposed on an underside of said first member for engagement with such handle.

17. The apparatus, according to claim 16, wherein said adhesive material is double faced tape.

18. The apparatus, according to claim 14, wherein said first and said second predetermined material is selected from at least one of plastic and metal.

* * * * *